(12) United States Patent
Cherubini et al.

(10) Patent No.: US 8,089,833 B2
(45) Date of Patent: Jan. 3, 2012

(54) STORAGE DEVICE AND OPERATING METHOD THEREFOR

(75) Inventors: Giovanni Cherubini, Rueschlikon (CH); Evangelos S. Eleftheriou, Zurich (CH); Charalampos Pozidis, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 1419 days.

(21) Appl. No.: 11/506,229

(22) Filed: Aug. 18, 2006

(65) Prior Publication Data

US 2007/0047427 A1 Mar. 1, 2007

(30) Foreign Application Priority Data

Aug. 18, 2005 (EP) ...................................... 0501799

(51) Int. Cl.
*G11B 7/00* (2006.01)

(52) U.S. Cl. .................................. 369/44.26; 369/126
(58) Field of Classification Search ........................ None
See application file for complete search history.

(56) References Cited

U.S. PATENT DOCUMENTS

| 4,343,993 | A | 8/1982 | Binnig et al. |
| 6,462,898 | B2* | 10/2002 | Blaum et al. ................ 360/77.08 |
| 2003/0218960 | A1* | 11/2003 | Albrecht et al. .............. 369/126 |
| 2004/0047246 | A1* | 3/2004 | Onoe et al. .................. 369/13.11 |
| 2008/0219134 | A1* | 9/2008 | Cherubini et al. ............ 369/126 |
| 2008/0247300 | A1* | 10/2008 | Albrecht et al. .............. 369/126 |
| 2008/0304379 | A1* | 12/2008 | Albrecht et al. ........... 369/47.15 |
| 2009/0003187 | A1* | 1/2009 | Cherubini et al. ............ 369/126 |

* cited by examiner

*Primary Examiner* — Paul Huber
(74) *Attorney, Agent, or Firm* — William Stock; Anne Vachon Dougherty (57) ABSTRACT

A storage device including a storage medium for storing data in the form of marks in multiple tracks aligned along track center lines, at least one read transducer for writing and reading said data stored in said storage medium, and an actuator for moving said storage medium relative to said at least one read transducer. The storage device further includes stored servo sequences, which are replicated by use of at least two different types of servo marks displaced by a given unique distance in a cross track direction relative to a respective track centerline, wherein the storage device is operable to retrieve servo sequences using read-back signals obtained from at least two different types of servo marks.

18 Claims, 7 Drawing Sheets

STORAGE DEVICE AND OPERATING METHOD THEREFOR

The present invention relates to a data storage device for storing data and a method for operating a data storage device.

BACKGROUND OF THE INVENTION

In the field of this invention, techniques are known that use nanometer sharp tips for imaging and investigating the structure of materials down to the atomic scale. Such techniques include scanning tunnelling microscopy (STM) and atomic force microscopy (AFM), as disclosed in U.S. Pat. No. 4,343,993 and EP 0 223 918 B1.

Based on the developments of scanning tunnelling microscopy and atomic force microscopy, new storage concepts have been introduced over the past few years profiting from these technologies. Probes having a nanoscale tip have been used for modifying the topography and for scanning an appropriate storage medium. Data are written as sequences of symbols represented by topographical marks, such as indentation marks and non-indentation marks. The tips comprise apexes with a radius in the lower nanometer range and the indentation marks have a comparable diameter, for example, a diameter in the range of 20 to 30 nm or even smaller. Hence, these data storage concepts promise ultra-high storage area density.

In STM, a sharp tip is scanned in close proximity to a surface. A voltage applied between the tip and the surface gives rise to a tunnel current that depends on the tip-surface separation. From a data-storage point of view, such a technique may be used to image or sense topographic changes on a flat medium that represent stored information in logical "0"s and "1"s. In order to achieve reasonably stable current, the tip-sample separation must be maintained extremely small and reasonably constant. In STM, the surface to be scanned needs to be a conductive material.

In AFM, the sharp tip rests on one end of a soft spring cantilever. When the sharp tip is in close proximity to a surface, resultant forces therebetween can be sensed by the extent to which they cause bending of the spring cantilever.

A storage device for storing data based on the AFM principle is disclosed in "The millipede—more than 1,000 tips for future AFM data storage" by P. Vettiger et al., IBM Journal Research Development, Vol. 44, No. 3, March 2000. The storage device has a read and write function based on the mechanical x-, y-scanning of a storage medium with an array of probes each having a tip. During operation, the probes scan an assigned field of the storage medium in parallel. That way, high data rates may be achieved. The storage medium comprises a polymer layer. The tips are moved across the surface of the polymer layer in a contact mode. The contact mode is achieved by applying small forces to the probes so that the tips of the probes can touch the surface of the storage medium. For this purpose, the probes comprise cantilevers which carry the sharp tips on their end sections. Symbols are represented by indentation marks or non-indentation marks in the polymer layer. The cantilevers respond to these topographic changes in the surface while they are moved across the surface.

Indentation marks are formed on the polymer surface by thermo-mechanical recording. This is achieved by heating the tip of a respective probe via a write heater with a current or voltage pulse during the contact mode in a way that the polymer layer is softened locally where the tip touches the polymer layer. The result is a small indentation on the layer having a nanoscale diameter.

Reading is also accomplished by a thermo-mechanical concept. A read heater on the cantilever is supplied with an amount of electrical energy, which causes the heater to heat up to a temperature that is not high enough to soften the polymer layer as is necessary for writing. The thermal sensing is based on the fact that the thermal conductance between the probe and the storage medium, especially a substrate on the storage medium, changes when the probe is moving in an indentation as the heat transport is more efficient. As a consequence of this, the temperature of the cantilever decreases and, hence, its resistance changes. This change of resistance is then measured and determines the read-back signal. Reading and also writing the marks is accomplished by moving each probe relative to the storage medium along a line representing a track and moving to the next track when the end of the respective line has been reached. A thermo-mechanical probe with read and write capabilities is also referred to as a read transducer. The amplitude of a read-back signal is defined as the difference in magnitude between a read-back signal sample that is obtained when the tip of the probe is exactly at an indentation center, and a sample obtained when the tip of the probe is at an indentation-free area of the storage medium, while the probe moves along a track center line. If the probe is not exactly on track, the reference point for the measurement of the amplitude is defined as the point where the probe meets a straight line that crosses the indentation center in the cross-track direction. Typically, the amplitude decreases monotonically with the distance from a track center line and vanishes at half the track pitch. This is also disclosed in Eleftheriou, E., et al., "Millipede—a MEMS based Scanning-Probe Data-Storage System", IEEE Transactions on Magnetics 39(2), March 2003, pp. 938-945.

EP-A-385161 discloses a storage device and a method for scanning a storage medium. The storage medium is designed for storing data in the form of marks and is scanned by an array of probes for mark detecting purposes in a scanning mode. The storage medium has fields with each field to be scanned by an associated one of the probes. At least one of the fields comprises marks representing operational data for operating the scanning mode. Scanning parameters are computed from the operational data and the scanning mode is adjusted according to the scanning parameters. The marks representing operational data may represent information for adjusting the position of the array of probes along a track. For that purpose, special marks are formed in the storage medium, preferably in respective fields of the storage medium, where such marks are preferably aligned along lines that are displaced in the cross-track direction relative to a track center line. By scanning the respective field comprising these marks, information on the actual position of the probes relative to the track center line can be derived and used for adjusting the position of the probe array in the cross-track direction. Other fields comprise marks forming periodic patterns along tracks. By scanning these fields, timing or clocking information may be obtained, which is used for adjusting the frequency of reading, writing or erasing pulses applied to the probes. These position or timing adjustments take effect for all of the fields and the respective allocated probes.

It is a challenge to provide a data storage device and a method for operating a data storage device, which enables the reliable retrieval of information with stringent requirements in respect to exact positioning of a read transducer, for a wide range of cross-track positions.

SUMMARY OF THE INVENTION

According to one aspect of the present invention, there is provided a storage device comprising: a storage medium for storing data in the form of marks in multiple tracks, the tracks being aligned along track center lines; at least one read transducer for writing and reading the data stored in the storage medium; and an actuator for moving the storage medium relative to the at least one read transducer; the storage device further comprising: stored servo sequences, which are replicated by use of at least two different types of servo marks, each type of servo mark being displaced by a given unique distance in a cross track direction relative to the respective track centerline, wherein the storage device is operable to retrieve the servo sequences using read-back signals obtained from the at least two different types of servo marks.

The actuator may, for example, be a tape-reel drive or a scanner, but is not limited to this. The transducers at least have reading capabilities. They may, however, also have writing capabilities. The servo marks may, for example, be of a topographic nature or may have a characteristic magnetic polarization or may even be of an optical nature. Respectively, the at least one read transducer is suitably designed corresponding to the nature of the servo marks.

In this way, the transducer may, for example, be a probe with a nanoscale tip or a magnetic read or write head. The storage device enables fast information retrieval, because exact cross track positioning of the at least one read transducer may be omitted prior to retrieving the information in a servo sequence. Exact cross track positioning of the transducer is considered as a position of the transducer aligned along the respective track center line. This is due to the fact that, by retrieving the servo sequences dependent on read-back signals obtained from at least two different types of servo marks, even in case of an actual cross track position of the at least one read transducer having a deviation from the track center line, reliable information retrieval is enabled. This is, in particular, advantageous after a jump of the at least one read transducer from one track to another, when typically the respective read transducer does not exactly land on the respective track center line. In this way the overall performance in view of the speed of data retrieval from the storage device may be significantly improved.

In a preferred embodiment of the first aspect of the invention, each of the servo sequences may comprise information representing a track identifier. This enables fast track identification and therefore is particularly advantageous when jumping from one track to a given other track and enables finding the target track in a very short time. In this way, it is possible to identify the current track without having the need to perform exact cross track positioning prior to retrieving the respective track identifier. This may save time especially when the read transducer lands on an intermediate track which is not identical to the respective target track.

In a further preferred embodiment of the first aspect of the invention, each of the servo sequences may comprise information representing timing information. In this way, the respective at least one read transducer may be brought in phase with a respective on track mark sequence in minimal time. Also, in this way, exact cross track positioning may be omitted prior to extracting and adjusting this timing information.

In a further preferred embodiment of the first aspect of the invention, the device may be operable to retrieve the servo sequences using a maximum amplitude selection criterion in respect of the read-back signals obtained from the different types of servo marks and, preferably, from at least two different types of servo marks. This enables, in a fairly simple way, to obtain good results in terms of a signal-to-noise ratio of the selected read-back signal with maximum amplitude, if the actual cross track position of the at least one read transducer is in a given sub-range of the displacement in the cross track direction of the two different types of servo marks.

In a further preferred embodiment of the first aspect of the invention, the device may be operable to retrieve the servo sequences by summing the read-back signals obtained from the at least two different types of servo marks. This enables good results in terms of the signal-to-noise ratio of the read-back signals, if the actual cross-track position of the at least one read transducer is in a given further sub-range of the displacement in the cross-track direction of the two different types of servo marks.

In a further preferred embodiment of the first aspect of the invention, the device may be operable to retrieve the servo sequences by calculating the estimated amplitude value of each of the read-back signals obtained from the at least two different types of servo marks and assigning a respective weight thereto. This results in very good results in terms of the signal to noise ratio in a larger sub range than for the non-weighted summing or the maximum-amplitude selection criteria. In this context, it is advantageous if the respective weight may be assigned in compliance with a maximal ratio combiner. The maximal ratio combiner is a diversity combiner in which the read-back signals are added together in a weighted sum, the weight being proportional to the root mean square signal level and inversely proportional to the root mean square noise level of the respective read-back signal. This enables to have an optimized signal to noise ratio over a wide range of possible cross track positions of the at least one read transducer. Furthermore, it is also advantageous if the weight may be proportional to the estimated amplitude value of the read-back signal to which the weight corresponds. This uses the insight that the noise power is equal if read-back signals have been obtained by the identical read transducer or read transducers with similar properties and being operated on the same storage medium, preferably in the same region. This then results in only the respective estimated amplitude being necessary for determining the respective given weight and therefore eases the calculation process.

According to a further preferred embodiment of the first aspect of the invention, the read-back signal generated by each servo mark may be correlated with a reference signal, and more preferably, the two read-back signals with the highest correlation to the reference signal are selected for retrieving the stored servo sequence. In this way, the reliability of the information retrieval may be further improved. The reference signal may, for example, be based on prior knowledge of the properties of the storage device.

According to a further preferred embodiment of the first aspect of the invention, the stored servo sequences are retrieved by way of four different types of servo marks: a first type being located with its center off centered in a positive cross track direction relative to the track center line by a quarter of a track pitch; a second type being located with its center off centered in a negative cross track direction relative to the track center line by a quarter of the track pitch; a third type being located with its center off centered in the positive cross track direction relative to the track center line by half of the track pitch; and a fourth type being centered with its respective center on the track center line. In this context, preferably, the track pitch ranges from a cross track extension of the servo marks to twice the cross track extension of the servo marks. In this way, the full range of cross track positions may be covered, that is, a reliable information retrieval is obtained for all possible cross track positions of the at least one read transducer.

According to a further preferred embodiment of the first aspect of the invention, when the servo marks are topographical marks, the track pitch may range from the cross track extension of the servo marks plus an additional ring width of a ring surrounding the topographical marks to twice the cross track extension of the servo marks. In this way, reliable information retrieval may be obtained in actual operation of the storage device even if indentations are surrounded by rings of higher topological profile than the storage medium background, as often observed in connection with indentation marks. The ring width is considered as the diameter of the ring.

In a further preferred embodiment of the first aspect of the invention, the stored servo sequences may be encoded with an error correcting code, a device embodying the present invention being operable to decode the error correcting code. In this way, an even higher robustness may be assured when retrieving the information in the servo sequences. The error correcting code may, by way of example, be simply the original binary sequence with an additional parity bit or more preferably a Hamming code, which is a coding scheme that yields the encoded binary sequence by linear transformation of the original sequence.

In a further preferred embodiment of the first aspect of the invention, each of the servo sequences may be stored serially in one of the tracks of a storage field or in a parallel or combined parallel and serial way in respective tracks of at least two of the storage fields.

In a further preferred embodiment of the first aspect of the invention, the storage device may comprise an array of the at least one read transducer operable to scan the storage medium for mark detection purposes, wherein the storage medium has respective fields to be scanned by an associated read transducer, wherein at least one of the respective fields comprises the servo marks. In this way, the amount of overhead caused by the servo marks may be very low in respect to the total number of fields present.

In a further preferred embodiment of the first aspect of the invention, the servo sequences may comprise additional information other than a servo information.

According to an embodiment of a second aspect of the invention, there is provided a method for operating a storage device as hereinbefore described, comprising the step of retrieving the servo sequences using read-back signals obtained from the at least two different types of servo marks. The second aspect corresponds to the first aspect of the invention and the same is true for its preferred embodiments and its advantages.

According to an embodiment of a third aspect of the invention, there is provided a storage device comprising: a storage medium for storing data in the form of marks in multiple tracks, the tracks being aligned along track center lines and the marks having a nominal position in an on track direction; at least one read transducer for writing and reading the data stored in the storage medium; and an actuator for moving the storage medium relative to the at least one read transducer; the storage device further comprising: stored servo sequences comprising different types of phase marks, each type of which is displaced by a given unique distance in the on track direction relative to the respective nominal position in the on track direction, and wherein the storage device is operable to retrieve the servo sequences using read-back signals obtained from at least two different types of the phase marks.

According to an embodiment of a fourth aspect of the invention, there is provided a method for operating a storage device according to the third aspect of the present invention, the method comprising the step of retrieving the servo sequences using read-back signals obtained from at least two different types of phase marks.

Any of the device features may be applied to a corresponding method aspect of the present invention and vice versa. Features of one aspect may be applied to any other aspect.

In any of the above aspects, the various features may be implemented in hardware, or as software modules running on one or more processors.

BRIEF DESCRIPTION OF THE DRAWINGS

Reference will now be made, by way of example, to the accompanying drawings, in which.

DETAILED DESCRIPTION OF THE DRAWINGS

Figure 1:
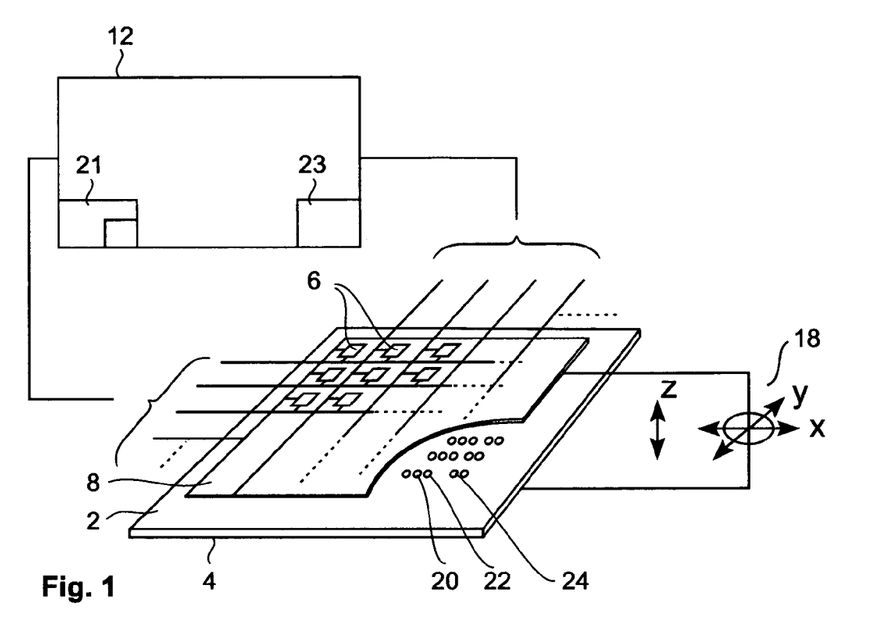
FIG. 1 is a perspective view of a storage device.

FIG. 1 shows a perspective view of a data storage device. The storage device comprises a storage medium 2 that is preferably formed by a polymer layer. The polymer layer may be formed of a thin polymethylmethacrylate (PMMA) layer. The storage medium 2 may, however, also consist of different materials like an electrically conductive material or magnetic material. The storage medium 2 is supported by a substrate 4. The substrate 4 is preferably formed of silicon.

An array of probes 6 is mounted on a common frame 8. Only a few probes are shown in FIG. 1. The storage device may, however, comprise a vast number of probes, such as 1024 or an even significantly larger number.

Each probe 6 comprises terminals, each of which is electrically connected to a control and information processing unit 12 via electrically conductive lines. The terminals may all be individually connected to the control and information processing unit 12. However, in order to reduce the complexity of the wiring, the terminals of the individual probes 6 may also be connected via row-lines and column-lines and possibly via multiplexers to the control and information processing unit 12.

The control and information processing unit 12 is designed for creating control parameters applied to the probes 6 via the terminals or sensing parameters present on the terminals, such as a current or a voltage potential, for a write or read modus. The nature of the control parameters and the sensing parameters depends on the nature of the storage medium 2. In an embodiment of the present invention, probes as described above are used as read transducers, however, it can be appreciated that the present invention is not limited to such use. The control and information processing unit 12 is further designed for controlling a movement of the storage medium 2 and the substrate 4 relative to the frame 8 in an x-, y- and z-direction, this being done via an actuator. In an embodiment of the present invention, the actuator is a scanner 18. In alternative embodiments, the actuator may, for example, be a tape-reel drive.

Hence, the storage medium 2 and the frame 8 containing the probes 6 are movable relative to each other. In an alternative embodiment, the scanner 18 may act on the frame 8 in order to move the frame 8 in the x-, y- and z-direction relative to the storage medium 2 and the substrate 4. A relative movement of the probes in a z-direction may also be accomplished by applying respective electrostatic forces on the probes 6 possibly containing a capacitive platform forming a first electrode of a capacitor and further comprising a second electrode being arranged in a fixed position relative to the storage medium 2.

In the storage medium 2, marks 20, 22 and 24 are present, which represent logical information. Preferably, they form topographic marks and the presence of an indentation may represent a logical "1" whereas the absence of an indentation may represent a logical "0". The marks 20, 22 and 24 are of a nanoscale diameter. It can be appreciated that the marks 20, 22 and 24 shown in FIG. 1 do not represent their real physical properties and that, whilst only a few marks 20, 22 and 24 are shown in FIG. 1, they can be significantly greater in number.

In an embodiment of the present invention, marks 20, 22 and 24 may represent more logic values than two and are not limited to certain physical properties. Marks can be represented by topographic properties such as the above-mentioned indentation marks on the storage medium or by electrical properties or by optical properties, or even by chemical properties. Marks may, for example, be represented by charge trap properties in a semi-conductor-oxide-dielectric structure. They may alternatively have amorphous or crystalline phase properties to be detected.

Figure 2:
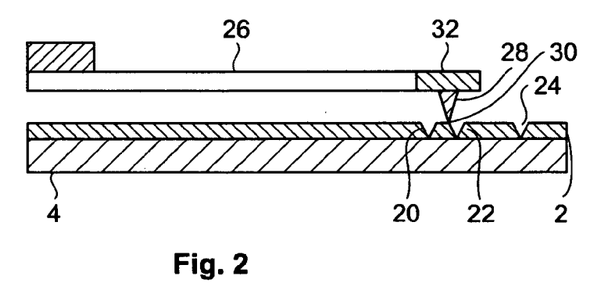
FIG. 2 is a cross-sectional view of part of the storage device shown in FIG. 1.
Figure 3:
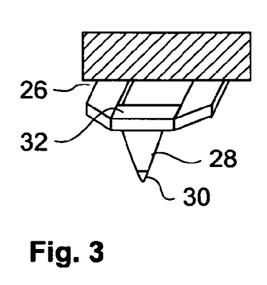
FIG. 3 schematically illustrates a probe arranged in the storage device shown in FIG. 1.

In FIG. 2, a cross-sectional view of the data storage device according to FIG. 1 is shown. Part of a probe 6 is shown. The probe 6 comprises a spring cantilever 26 on which a tip 28 is mounted having an apex 30 with a radius in the low nanometer range. The marks 20, 22 and 24, shown as indentation marks, are formed by pushing the apex 30 of the tip 28 into the storage medium 2.

The probe 6 comprises the spring cantilever 26 and a write/read element 32. The write/read element 32 may be formed as a temperature dependent resistor, which is thermally coupled to the tip 28. The write/read element 32 may, however, also comprise separate write and read elements. They are then preferably, at least on one side, connected to different terminals of the probe 6 and are in that way independently controllable. Such separately formed write and read elements have the advantage that they may be designed specifically for purposes necessary for the write and, respectively, the read modus. The read element may instead of being a temperature dependent resistor, also be formed as a capacitive platform. Depending on the particular application, the write/read element 32 or the write element may be embodied as a further capacitive platform. If the further capacitive platform is present, a further electrode arranged in a fixed position to the storage medium 2 is provided. By appropriately charging the capacitor formed by the further capacitive platform and the respective electrode, the probe 6 may be provided with a suitable electrostatic force pushing the tip 28 during the write modus into the storage medium 2 in order to form the marks 20, 22 and 24. This way of creating marks 20, 22 and 24 may also be referred to as "cold writing".

The spring cantilever 26 and the write/read element 32 preferably are fabricated from silicon. Electrically conductive connections to the terminals of the probe consist preferably of highly doped areas of the spring cantilever 26, whereas the write/read element 32, in the case of being formed as a temperature dependent resistor, may be formed by less doped silicon, which yields a high electrical resistance.

In the presence of the capacitive platform or the further capacitive platform, these platforms are formed by highly doped respective areas formed of silicon. The tip 28 may also be fabricated from silicon and may not be doped or be doped with a varying degree, depending on the application. In the case of the AFM based data storage device, the tip 28 does not need to be electrically conductive. In the case of an STM based data storage device, the tip, however, needs to be electrically conductive. The tip may also be formed from a different material, such as a magnetic material.

Figure 4:
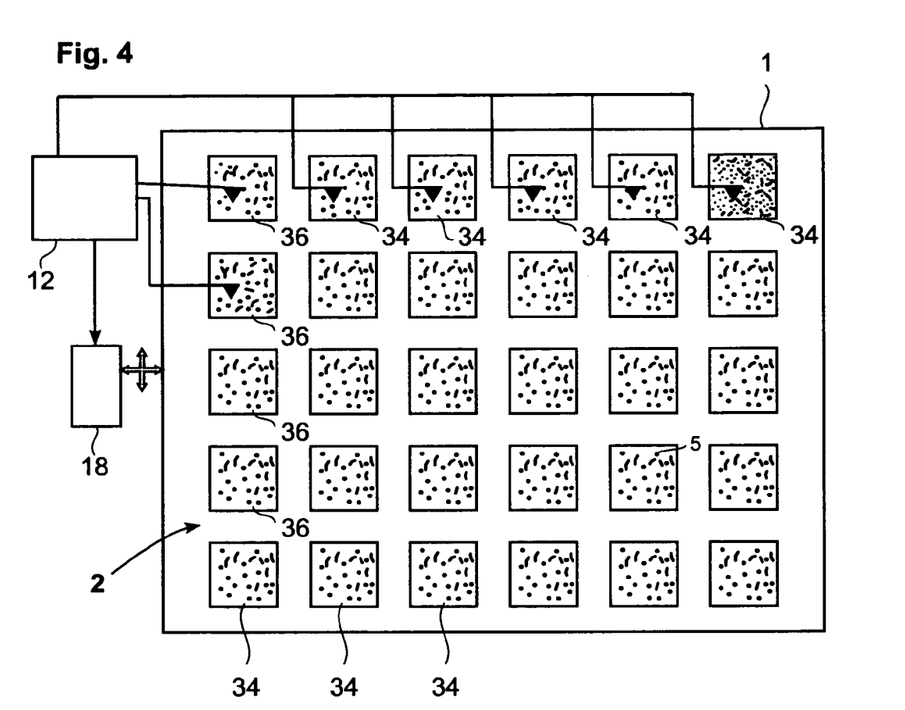
FIG. 4 is a top view of the storage medium in the device shown in FIG. 1.

As can be seen most clearly from FIG. 4, during operation of the storage device, each probe 6 is moved across its respectively assigned field 34, 36 in the storage medium 2. It is moved along lines, each line forming a track. The data are written and respectively read consecutively along the respective tracks and, at the end of each track, the respective probe 6 is moved to the next track.

Figure 4A:
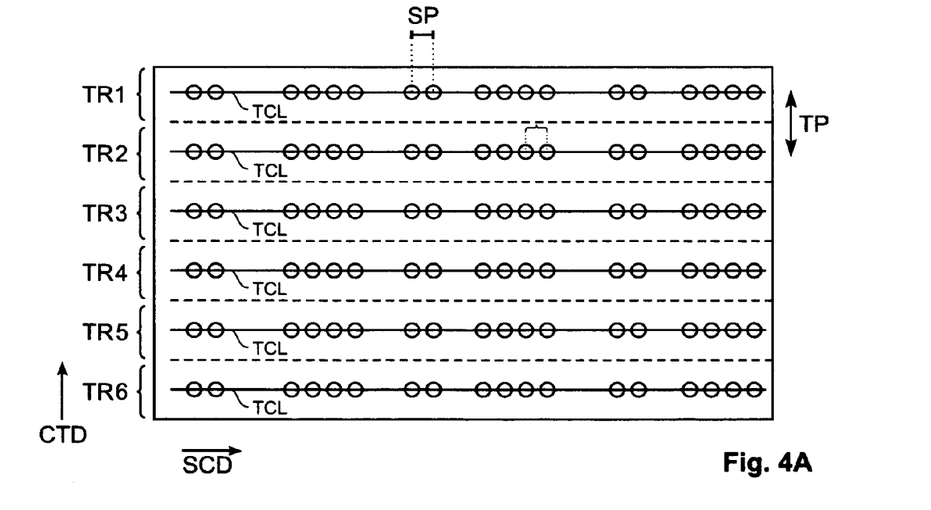
FIG. 4a schematically illustrates the layout of tracks in the storage medium of FIG. 4.
Figure 5A:
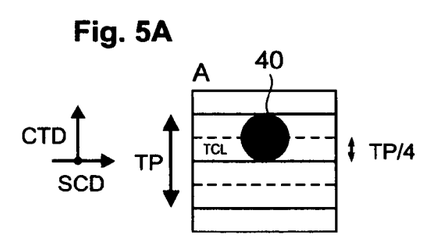
FIGS. 5a to 5d illustrate first to fourth types of servo marks according to an embodiment of the present invention.
Figure 5B:
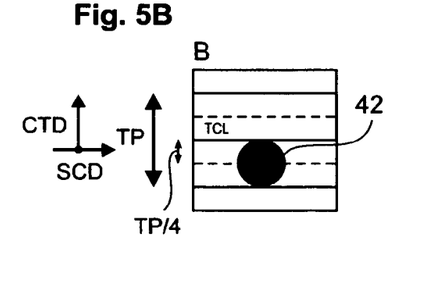
Figure 5C:
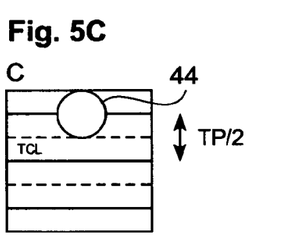
Figure 5D:
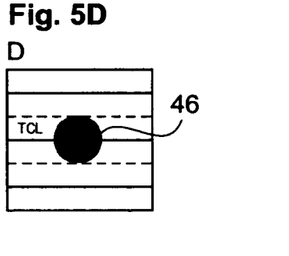

FIG. 4A shows part of a field, in particular a data field 34. Tracks TR1, TR2, TR3, TR4, TR5 and TR6 are shown. Each track has its track center line TCL, represented by the solid lines. A distance between two tracks, that is between two consecutive track center lines TCL, is a track pitch TP. By way of example, FIG. 4A depicts the storage of identical data in the respective tracks. However, it can be appreciated that, in an embodiment of the present invention, different data is stored in the respective tracks.

A scanning direction SCD is the direction of on track relative movement between each probe 6 and the storage medium 2. This may also be referred to as on track direction. A cross track direction is denoted by CTD. It is perpendicular to the on track direction. An on track distance between adjacent marks is denoted by SP. The respective time for scanning the on track distance SP between adjacent marks is denoted by T. An on track mark rate is given by 1/T.

During the write modus, the probe 6 is scanned in the scanning direction SCD in the line of the respective track TR1 to TR6. Marks 20, 22 and 24 are created by heating the write/read element with a heating pulse obtained by a respective current or voltage pulse. The heat dissipated from the write/read element softens the storage medium and the tip 28 forms a respective indentation as the mark 20, 22 and 24 if the spring formed by the cantilever is imposed with a respective force. This force may be inherent to the mechanical properties of the spring cantilever 26. It may, however, also be created in another way, such as, for example, by the electrostatic force. In this case, a respective force pulse is imposed to the respective capacitor in order to charge the capacitor respectively. Alternatively, only a suitably chosen force pulse may be provided if cold writing should be achieved. The heating pulse and also the force pulse need to be timely synchronized in order to achieve the desired on track distance SP between adjacent marks 20, 22 and 24. For that purpose, a clocking signal is necessary, which is created by the clocking signal unit.

During a read modus, the probe 6 is scanned in the scanning direction SCD along each line of the respective track TR1 to TR6. When the tip 28 reaches an indentation representing a mark 20, 22 and 24, the tip 28 moves into the respective indentation as the tip 28 is pressed onto the storage medium 2 with a given spring force. This movement into the respective indentation may then be sensed by exploiting the resulting change in heat dissipation from the write/read element 32 due to changed thermal coupling to the storage medium 2 and the substrate 4. In order to sense this change, the write/read element 32 is either continuously provided with a given voltage or current or electrical power, which heats up the read/write element 32 to a given temperature, for example 200° C., which is low enough to prevent the storage medium 2 from softening in a way that the marks 20, 22 and 24 degrade. Alternatively, the write/read element 32 may only be provided intermittently with the heat pulse suitably chosen in the amount of electrical power supplied for the read modus in timely synchronization with a possibly expected mark 20, 22 and 24.

Alternatively, the movement of the tip 28 into a respective indentation may be sensed by sensing a change in the capacitance of the capacitor formed by the capacitive platform or a further capacitive platform. This may, for example, be achieved by sensing a change in charge or voltage potential. For that purpose, the respective capacitor may be provided either continuously or intermittently with a given charge or voltage. The above mentioned voltages, electrical currents, charges and other derived quantities represent a read-back signal x in an embodiment of the present invention.

For adjusting the displacement in the cross track direction of the probe 6 and its associated tip 28 in respect to the respective track TR1 to TR6 a tracking signal TR_S may be provided by the servo positioning unit.

FIG. 4 shows various fields of the storage medium 2. A respective probe 6 is assigned to each field. The probes 6 are only scanned across their individually assigned field. Most of the fields contain marks used for storing general data. These fields are called data fields and some of them have been denoted with the reference numeral 34. The storage medium 2 is shown in FIG. 4 with thirty fields. It may, however, comprise a different number of fields, such as 1024 or an even larger number. Some fields contain marks representative of operational data of the storage device and are the so-called operational data fields 36. There may, for example, be one or more operational data fields 36 containing marks being formed and located in a way that the clocking signal CLK_S may be deduced by operating the respectively assigned probe 6 in the read modus. For that purpose, such an operational data field 36 may contain consecutive marks 20, 22 and 24 along each line spaced at the desired minimum distance to each other.

At least one other operational data field 36 or part of the above mentioned operational data field 36 comprises marks which are located and formed suitably in a way that the tracking signal TR_S may be deduced when operating the respectively assigned probe 6 in the read modus.

The marks independent of their physical properties have a cross track extension. In case of indentations, the cross track extension is equal to two times the radius R of the respective mark 20, 22, 24. An amplitude of the respective read-back signal x is given as the difference in magnitude between a read-back signal sample obtained when the probe 6 is exactly in an indentation center and a sample obtained when the probe 6 is in an indentation free area of the storage medium 2, while the probe moves along a track center line TCL. If the probe 6 is not exactly on a track TR1 to TR6, the reference point for the measurement of the amplitude is defined as the point where the probe 6 meets a conceptual straight line that crosses the indentation center in the cross track direction CTD. The maximum read-back signal amplitude, obtained when the probe moves along a track center line TCL, is denoted by AMP_MAX.

For the purpose of centering the respective probes 6 on the respective track center lines TCL the tracking signal may be deduced from respective read-back signals x when scanning over given servo marks 40, 42, 44 and 46 of respective associated probes. As can be seen from FIGS. 5a to 5d, the servo marks 40, 42, 44 and 46 are of different types, each type being characterized by a given unique displacement in the cross track direction relative to the respective track center line TCL. For the purpose of creating the tracking signal they may be arranged in a specially designated operational data field 36, being stored serially in at least one of the respective tracks. This is especially preferred, if the read-back signal x for creating the tracking signal is deduced from the read-back signal only of one probe 6. This may in particular be the case if only one probe is present.

In the preferred case, however, each different type of servo mark 40, 42, 44 and 46 is stored in a separate operational data field 36 and this preferably in a way, that respective read-back signals x are obtained in parallel from the respectively associated probes 6. It may however also be the case that combined serial and parallel approaches are taken. First to fourth types of servo marks 40, 42, 44 and 46 are shown by way of example in FIGS. 5a to 5d. In this case the radius R of the servo marks 40, 42, 44 and 46 is assumed to be a quarter of the track pitch TP. A first type, which is referred to as an A-type is located with the center of the servo mark 40 off centered in the positive cross track direction CTD relative to the track center line TCL by a quarter of the track pitch TP. A second type of servo-mark referred to as a B-type of servo mark 42, is located in a negative cross track direction respectively to the A-type and is off centered from the track center line TCL by a quarter of the track pitch TP. A third type of servo mark, which is referred to as C-type servo mark 44, is in the positive cross track direction with its center located at a distance of half the track pitch TP from the track center line. A fourth type, which is referred to as D-type servo mark 46, is centered with its respective center on the track center line TCL. For the purpose of obtaining the tracking signal, preferably series of the servo marks 40, 42, 44 and 46 are stored in the respective operational data fields 36. When scanning with the associated probes 6 over these servo marks 40, 42, 44 and 46 this results in so called bursts, represented by the respective read-back signals. The respective operational data fields 36 may also be denoted by A-field, B-field, C-field, D-field. The cross track distance between the centers of the A-type and B-type servo marks 40, 42 and between the respective servo marks 44, 46 of the C-type and the D-type is equal to half the track pitch TP. The distance between the centers of the C-type servo marks 44 and the A-type servo marks 40, the A-type servo marks 40 and the D-type servo marks 46, the D-type servo marks 46 and the B-type servo marks 42, and the distance between the C-type servo marks 44 and the B-type servo marks 42 is equal to a quarter of the track pitch TP. This enables to create a precise tracking signal being derived from a position error signal. The way this may be achieved and also the way the servo marks may be located is disclosed in EP-A-1385161, which is incorporated by reference herein for that purpose.

Figure 6A:
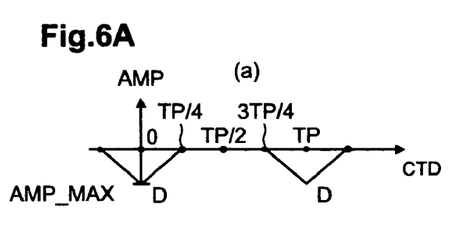
FIGS. 6a to 6d show cross track profiles of a signal amplitude for the first to fourth types of servo marks shown in FIGS. 5a to 5d.
Figure 6B:
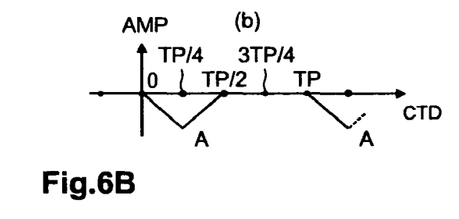
Figure 6C:
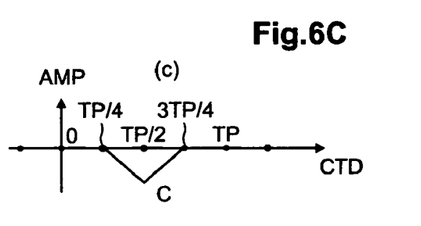
Figure 6D:
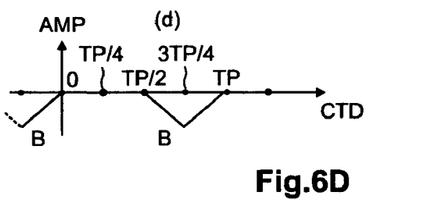

Read-back signals x obtained from scanning over the respective types of servo marks are denoted as x_A for the A-type servo mark 40, as x_B for the B-type servo mark 42, x_C for the C-type servo mark 44 and x_D for the D-type servo mark 46. The resulting amplitude AMP of the A-type read-back signal x_A is shown in FIG. 6b dependent on the cross track distance of the respective tip of the respective probe relative to the respective track center line TCL in the cross track direction CTD. Respective amplitudes for the B-type read-back signal x_B, the C-type read-back signal x_C and the D-type read-back signal x_D are shown in FIGS. 6d, 6c, and 6a.

The amplitudes AMP plotted over the distance in the cross track direction in FIGS. 6a to 6d represent a cross track profile of the read-back signal x that would be obtained by scanning indentations in the cross-rack direction CTD, along a straight line crossing the indentation center. For the purpose of the FIGS. 6a to 6d, it is assumed that the indentations have perfect conical shapes and that rings are absent. The radius R of the indentations is, in this case, a quarter of the track pitch TP. The period of the cross track repetition of marks in each of the respectively assigned A to D-fields is equal to the track pitch TP. Similar cross track profiles may be present, if the respective servo marks 40, 42, 44 and 46 are not topographic marks but other above already-explained marks.

Figure 7:
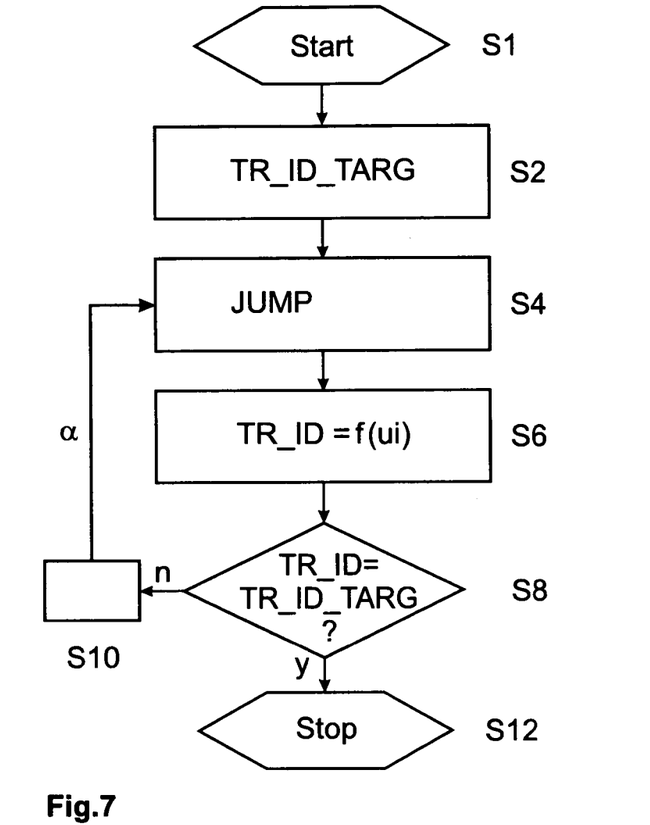
FIG. 7 is a flow chart of a program used for jumping in a cross track direction in an embodiment of the present invention.

When reading data from the storage medium 2 or writing data to the storage medium 2, it is often necessary to perform jumps in the cross track direction CTD from one track to a target track. If such a jump needs to be performed, a program according to the flow chart of FIG. 7 is started in a step S1. In this step, variables may be initialized.

In step S2, a target track identifier TR_ID_TARG is determined. In this respect it is to be noted, that each track TR1 to TR6 may be identified by a unique track identifier TR_ID. The track identifier TR_ID may be given relative to the respective tracks in the respective field 34, 36.

In a step S4, a seek mode is started depending on the estimated distances from the current track to the target track. During the seek mode, the probe is rapidly moved to a position close to the target track. For this purpose, the scanner 18, which acts as the actuator, is controlled in an appropriate way. After performing the seek mode, the cross track landing position of the respective probe 6 is generally unknown. As the read-back signal's x amplitude is reduced depending on the cross track distance from the track center line TCL, a detection of the respective track identifier TR_ID may become unreliable, if the respective probe 6 is not positioned on or close to the respective track center line TCL. One approach for solving this problem is to position the respective probe 6 very close to the track center line TCL by assistance of a position error signal obtained from bursts of servo marks. This, however, has the drawback, that it introduces significant delays and therefore increases the time needed for finding the target track. This time consuming servo positioning may be omitted, if the track identifier TR_ID of the current track, close to which the probe 6 has landed is determined in step S6 based on a servo sequence ui, which is retrieved from the storage medium 2 in the way explained below by the program of FIG. 8 or 9. The servo sequence ui represents, for the purpose of the program of FIG. 7, the track identifier TR_ID. The servo sequence ui may represent, for other purposes, also other types of information, such as a timing information or other information in addition to servo information.

In a step S8 it is checked, whether the track identifier TR_ID obtained in step S6 is equal to the target track identifier TR_ID_TARG. If this is not the case, then in a step S10, new control parameters for the scanner 18 are calculated for providing a further cross-track adjustment in a further run of step S4. If the condition of step S8 is fulfilled, then the program is terminated in step S12.

A program for retrieving the servo sequence ui is started in a step S40 (see FIG. 8), where variables may be initialized.

Figure 8:
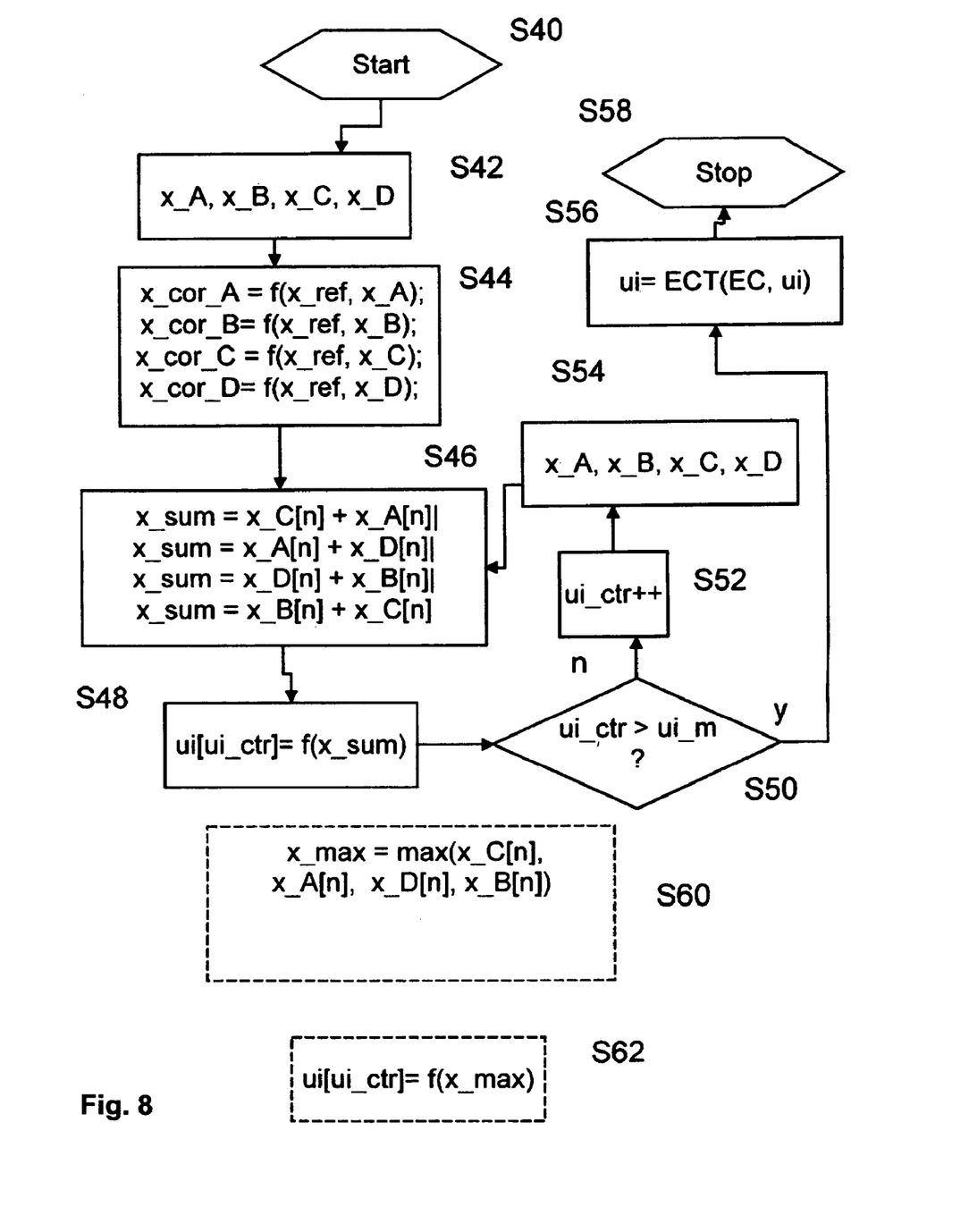
FIG. 8 is a flow chart of a program for retrieving a stored servo sequence in an embodiment of the present invention.

In a step S42, read-back signal samples of A- to D-type servo-marks, i.e. x_A, x_B, x_C and x_D, are obtained by sampling the respective continuous-time read-back signals at a sampling rate of Q/T, where Q denotes the number of samples obtained while scanning in the scanning direction SCD one on track distance SP between adjacent marks. Nearly perfect phase alignment may be ensured, if there is enough prior knowledge about the operation of the storage device or if, prior to step S42, a clocking signal has been obtained. The n-th sample of a sequence of read-back signal samples is denoted by the index "[n]". Therefore, in a general way, read-back signal sample x [n] is equal to the analog read-back signal x at a point of time being given by nT/Q. A sequence of read-back signal samples is also referred to as a read-back signal.

In a step S44, the A- to D-type read-back signals x_A, x_B, x_C, x_D are correlated to a reference signal x_ref. The reference signal x_ref may, for example, be obtained when scanning the respective probe 6 along the track center line TCL of the D-field, which comprises servo marks 46 with their centers on the track center line, and when the probe is fairly perfectly aligned with the track center line TCL. This reference signal may be available in the control and information processing unit while running the program of FIG. 8. It may also be stored based on prior knowledge of the behaviour of the storage device. It may, however, also be obtained in another way, for example, by scanning, prior to running the program of FIG. 8, with a probe in the scanning direction SCD in alignment with the TCL of a track in a field. Under the assumption that the indentations are of conical shape, a triangular pulse signal is the reference signal x_ref.

In this way, A- to D-type correlation values x_cor_A, x_cor_B, x_cor_C and x_cor_D are obtained. It is then evaluated which of the A- to D-type correlation values x_cor_A, x_cor_B, x_cor_C and x_cor_D have the two highest correlation values being representative of the two strongest correlations to the reference signal x-ref. The respective two read-back signals from the A- to D-type read-back signal x_A to x_D are then selected for the following steps of the program according to FIG. 8. By making this selection process in step S44 it can be determined in which of the four TP/4 ranges in the cross track direction CTD relative to the track center line, the respective probe or probes 6 are in alignment. The following steps S46 to S54 are then conducted with the selected pair of A- to D-type read-back signals x_A, x_B, x_C, x_D.

Figure 10:
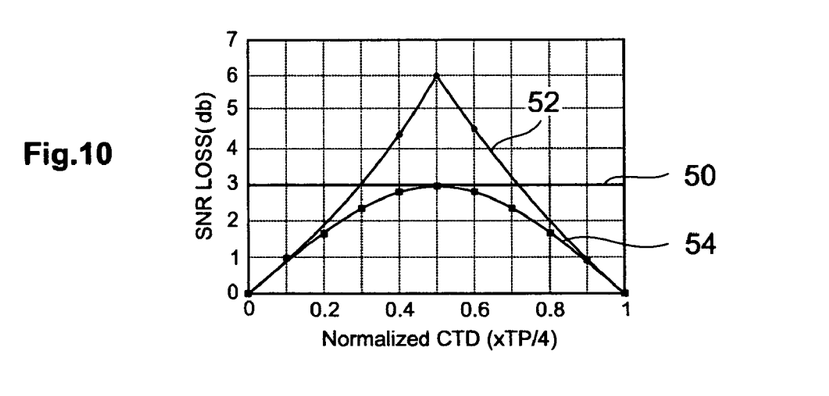
FIG. 10 is a plot of signal to noise ratio losses.

In a step S46, samples x_A[n] to x_D[n] from the two respectively selected A- to D-type read-back signals are summed up in order to form a sum read-back signal sample x_sum. FIG. 10 shows a respective signal to noise ratio SNR loss in dB (A) depending on the actual cross track position in the cross track direction CTD of the respective tip 28 of the respective probe 6. The signal to noise ratio SNR is plotted over one quarter of the track pitch TP and is the same for all four quarters of the track pitch TP. The signal to noise ratio SNR loss of the sum read-back signal x_sum is denoted by 50. It can be seen in the FIGS. 6b and 6c that combining the A and C-type read-back signal samples x_A[n], x_C[n] in the range from a zero distance from the track center line TCL up to, in a positive direction, a quarter of a track pitch of the distance from the track center line TCL, the sum read-back signal has the same amplitude as an ideal signal, i.e. there is no signal power lost. An ideal signal is defined as a read-back signal obtained from a probe being perfectly aligned in the cross track direction with the track center line. However, assuming that the noise processes in all read-back signals are mutually uncorrelated and have equal power, the noise power of the sum read-back signal will be twice as high as the noise power in any read-back sequence alone. Therefore, the signal to noise ratio SNR is 3 dB lower than the signal to noise ratio SNR of the ideal signal.

The respective bit of the servo sequence ui to be retrieved is then determined depending on the sum read-back signal sample x_sum in a step S48. For determining whether the respective bit is a logical "1" or a logical "0", the sum read-back signal sample x_sum may be compared to a respective threshold. The respective threshold is preferably calculated dependent on the values of the at least two highest correlation values of the A- to D-type, which improves the reliability of correctly detecting the respective logical value.

In a step S50, it is checked, whether a servo sequence counter ui_ctr has reached a servo sequence mark amount ui_m, which is given. If this is not the case, the servo sequence counter ui_ctr is incremented and in a step S54 new samples of the A- to D-type read-back signals x_A to x_D are obtained or at least the two selected A- to D-type read-back signals are sampled. After that, execution is continued in step S46 with the samples obtained in step S54.

If the condition of step S50 is fulfilled, then the servo sequence ui is fully retrieved from the storage medium by combining the signals of the two type of selected servo marks 40, 42, 44 and 46 and execution of the program may be finished in step S58.

Prior to step S58, a step S56 may be processed, in which the servo sequence ui may be subjected to an error correcting code transformation ECT with a further input possibly of part of the servo sequence ui being representative of an error correcting code EC. Such an error correcting code transformation may, for example, be based on a checksum. In a preferred embodiment it may be a Hamming code. In this way, up to a several bits of the servo sequence ui may be reconstructed, even if they were retrieved in an incorrect way. The amount of bits that can be reconstructed depends on the error code used and the amount of overhead being present in the servo sequence ui. In this way the robustness of retrieval of the servo sequences ui may be even further enhanced. However, the storage overhead is then increased and also the overall computational complexity increases.

The servo sequences ui are stored as identical servo mark patterns in the respective A- to D-fields and therefore only differ from each other in the cross track position of the respective servo marks 40, 42, 44 and 46. This enables, in the case of the program according to FIG. 8, to retrieve the track identifiers TR_ID of a current track without the need for prior aligning of the respective probes 6 precisely with the track center line TCL of the respective track. This significantly saves time when jumping from one track to the target track, especially if there are several iterations until the target track is actually hit.

In an alternative embodiment of the program according to FIG. 8, steps S46 and S48 are replaced by steps S60 and S62. Step S60 is different from step S46 in the way that a maximum selection read-back signal sample x_max is obtained by selection of one of the read-back signal samples x_A [n] to x_D [n], namely the one with maximum respective correlation value x_cor_A to x_cor_D. The signal to noise ratio SNR loss of the maximum selection read-back signal x_max is also plotted in FIG. 10 being identified by the numeral 52. In the center of the shown range, the signal to noise ratio SNR loss is 6 dB, however, at the edges of the respective ranges the signal to noise ratio SNR loss is negligible. Therefore, it may be concluded that whenever the actual cross track position of the tip of the respective probe 6 is closest to the edges of the shown ranges of FIG. 10, the maximum selection according to step S60 gives a better result, whereas around the middle of the respective range plotted in FIG. 10 the summing of the two selected A- to D-type read-back signals x_A to x_D gives better results.

In step S62, the respective bit of the current servo sequence is then determined depending on the maximum selection read-back signal sample x_max in a similar way as is the case in step S48.

Figure 9:
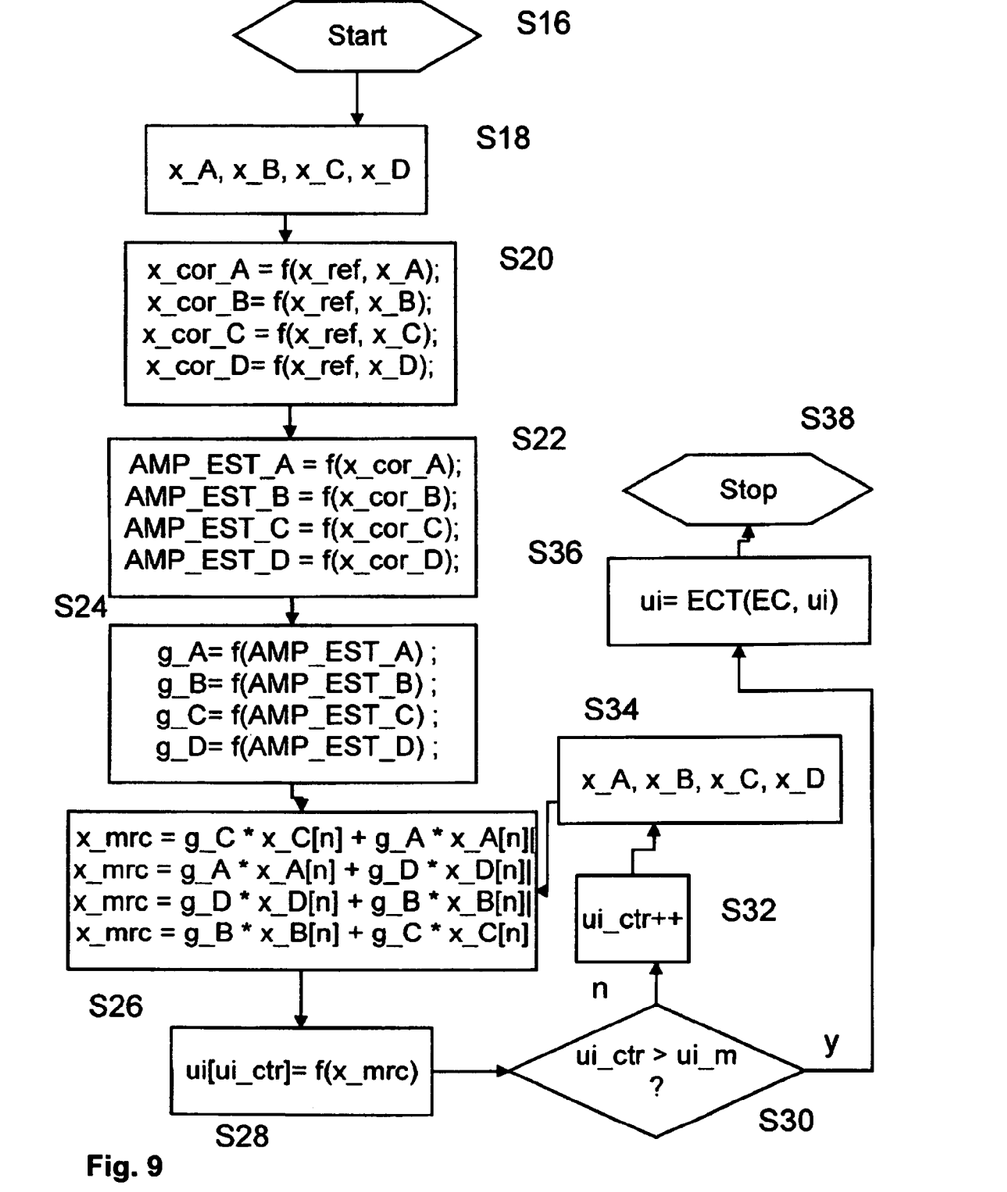
FIG. 9 is a flow chart showing further embodiments of a program for retrieving servo sequences.

In a further embodiment of the program for retrieving the servo sequence ui, the program is started in a step S16 (FIG. 9). In this step also variables may be initialized. A step S18 and a step S20 correspond to the steps S42 and S44.

In a step S22, at least the amplitudes of the two in step S20 selected A- to D-type read-back signals x_A to x_D are calculated as estimated amplitudes AMP_EST_A, AMP_EST_B, AMP_EST_C, AMP_EST_D. The A- to D-type correlation values have the advantage, that they are representative of the amplitude of the respective read-back signals to be detected in the actual position in respect to the track center line TCL of the respective tips 28 of the respective probes 6.

In a step S24, weights g_A to g_D or at least respective weights of the selected types of servo marks yielding the two highest correlation values x_cor_A to x_cor_D in step S20 are calculated depending on the respectively estimated amplitudes AMP_EST_A to AMP_EST_D. In a simple implementation, the weights g_A to g_D may be equal to the respective estimated amplitudes AMP_EST_A to AMP_EST_D. This yields particularly reliable results especially in connection with the following step, if the respective probes scan the same storage medium 2 and the respective probes are of similar nature and preferably scan similar regions. In that case, it is reasonable to assume that the noise powers of their read-back signals are equal. If this is the case, in a step S26 maximal ratio combiner read-back signal values x_mrc may, with high accuracy, be calculated by use of the formulas shown in step S26 and by assigning the estimated amplitudes AMP_EST_A to AMP_EST-D directly to the respective weights g_A to g_D. The respective signal to noise ratio SNR loss when using the maximal ratio combiner read-back signal sample x_mrc is also shown in FIG. 10 and is denoted by the numeral 54. In this case, the signal to noise ratio SNR loss is 3 dB at the center of the shown range, but less than 3 dB at any other point. This embodiment is the most preferred embodiment if signal to noise ratio SNR loss should be minimized.

Step S28 differs from step S48 in that the sum read-back signal sample x_sum is replaced by the maximal ratio combiner read-back signal sample x_mrc. Steps S30, S32, S36, S34 and S38 correspond to steps S50, S52, S54, S56 and S58.

The robustness of the retrieval of the servo sequences ui in the programs according to FIG. 8 or 9 is in relation to a satisfaction of the certain conditions on the shape of the servo marks 42 to 46 and their positioning in the cross track direction CTD. One of these conditions is that none of the noiseless read-back signals x_A to x_D vanishes at any instance that is at any cross-track position. For this to be avoided, the cross track extension of the radius of the servo-marks should be greater, in the case of conically-shaped indentations, than a fourth of the track pitch TP. A further condition is imposed by the requirement that the servo marks 42 to 46, represented by the topographic marks, in adjacent tracks TR1 to TR6 of the same field 36 should not overlap in the cross track direction CTD. This translates into the condition that the radius R of the respective indentations should be smaller or at most equal to half the track pitch TP. Combining these, the following necessary condition is obtained, which confines the track pitch TP to:

$$2R <= TP <= 4R \qquad (1)$$

Figure 11:
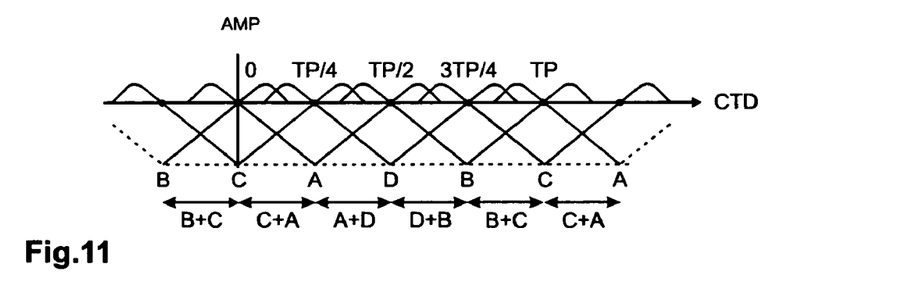
FIG. 11 shows overlaid cross track profiles with rings.
Figure 12A:
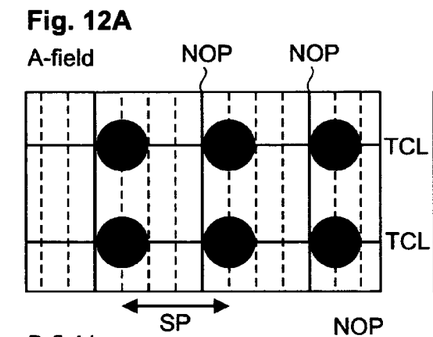
FIGS. 12a to 12d illustrate first to fourth type phase marks according to a further embodiment of the present invention.
Figure 12B:
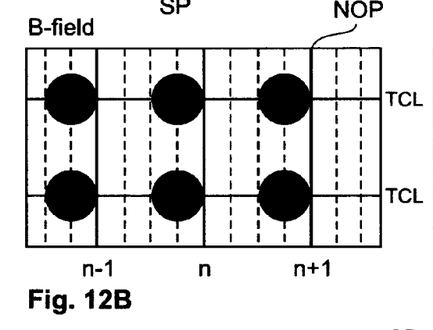
Figure 12C:
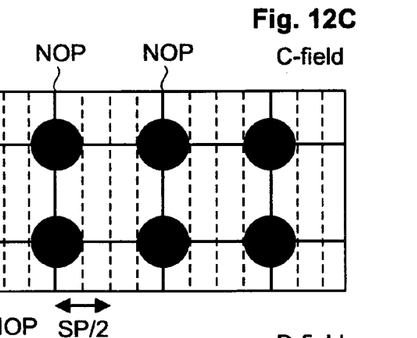
Figure 12D:
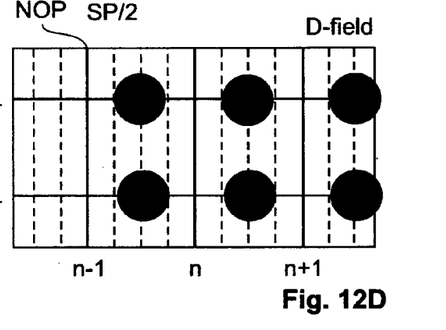

However, in the case of the servo marks 42 to 46 being formed by topographic marks in the form of indentations and non-indentations, the assumption of a perfect cone doesn't always hold in practice. It has been shown that indentations are usually surrounded by rings of higher topological profile than the polymer background. FIG. 11 shows cross track profiles of respective amplitudes of read-back signals of the four types of servo marks if the respective radius R of the indentations is equal to a quarter of the track pitch TP. As long as the radius R is greater or equal to a quarter of the track pitch TP so that rings from one mark do not overlap with depressions from adjacent servo marks, no destructive interference arises and a pairwise combination with, for example, the maximal ratio combiner approach remains optimal. However, the second boundary condition, similar to the case of the absence of rings, is imposed by the requirement that indentations in adjacent tracks TR1 to TR6 of the same field 36 should not overlap in the cross track direction. This requirement can be slightly relaxed in the case of marks with rings. It has been shown that the rings of adjacent servo marks may overlap, without the indentations affecting each other in any way. However, placing adjacent servo marks 40, 42, 44 and 46 any closer than that may cause mutual interference between them. Denoting the width of the respective ring by d_R, the track pitch is confined to:

$$2R+d\_R<=TP<=4R \quad (2)$$

The approach exploited by the programs according to the FIGS. 8 and 9 and shown in the respective FIGS. 5a to 5d and FIGS. 6a to 6d may also be modified to have, instead of the cross track direction CTD offset servo marks 40 to 46, respectively offset phase marks being offset in the scanning direction. These phase marks are then also offset relative to a nominal position in on track direction (NOP) (see FIGS. 12a to 12d). Each nominal position in on track direction (NOP) is spaced apart from an adjacent nominal position in on track direction (NOP) by the on track distance SP between adjacent phase marks. There may also be respectively several types of phase marks corresponding to the A- to D-type servo marks as A- to D-types phase marks. By correspondingly choosing the radius of the phase marks and the respective on track distance SP between the adjacent phase marks, servo sequences ui may be retrieved independent of the position of the read transducer in on track direction. In this case, an exact phasing signal may be omitted. In this case, it is however advantageous if the respective probe is in close alignment with the respective track center line TCL. FIGS. 12a to 12d illustrate respective A- to D-fields for the respective phase marks. The programs used for retrieving servo sequences in this way correspond to the ones shown in FIGS. 8 and 9.

The various embodiments that have been described above may be implemented using software modules running on a processor, for example by a digital signal processor. The programming of such modules will be apparent to the skilled person from the description of the various functions. The skilled person will appreciate that such modules may be programmed using any appropriate programming language. Alternatively, some or all of the functions described above may be implemented using dedicated hardware.

It will be understood that the present invention has been described above purely by way of example, and modifications of detail can be made within the scope of the present invention.

Each feature disclosed in the description, and (where appropriate) the claims and drawings may be provided independently or in any appropriate combination.

The invention claimed is:

1. A storage device comprising:
a storage medium for storing data in the form of marks in multiple tracks, each of said tracks being aligned along a respective track center line;
at least one read transducer for writing and reading said data stored in said storage medium; and
an actuator for moving said storage medium relative to said at least one read transducer;
the storage device further comprising:
stored servo sequences, which are replicated by use of at least two different types of servo marks, each type of servo mark being displaced by a given unique distance in a cross track direction relative to a respective track center line, wherein said storage device is operable to retrieve said servo sequences using read-back signals obtained from said at least two different types of servo marks, said device being operable to retrieve said servo sequences by calculating an estimated amplitude value of each of said read-back signals obtained from said at least two different types of servo marks and assigning a respective weight thereto.

2. The storage device according to claim 1, wherein each of said servo sequences comprises information representing a track identifier.

3. The storage device according to claim 1, wherein each of said servo sequences comprises information representing timing information.

4. The storage device according to claim 1, wherein said respective weight is assigned in compliance with a maximal ratio combiner.

5. The storage device according to claim 1, wherein said weight is proportional to the estimated amplitude value of the read-back signal to which said weight corresponds.

6. The storage device according to claim 1, wherein the read-back signal generated by each servo mark is correlated with a reference signal.

7. The storage device according to claim 6, wherein two read-back signals with the highest correlation to said reference signal are selected for retrieving the stored servo sequence.

8. The storage device according to claim 1, wherein track pitch comprise a distance between two adjacent track center lines and wherein the stored servo sequences are retrieved by way of four different types of servo marks comprising:
a first type of servo mark being located with its center off centered in a first cross track direction relative to the respective track center line by a quarter of the track pitch;
a second type of servo mark being located with its center off centered in a second cross track direction relative to the respective track center line by a quarter of said track pitch, wherein said second cross track direction is opposite to said first cross track direction;
a third type of servo mark being located with its center off centered in the first cross track direction relative to the respective track center line by half of said track pitch; and
a fourth type of servo mark being centered with its respective center on the respective track center line.

9. The storage device according to claim 8, with said track pitch ranges from a cross track extension of said servo marks to twice said cross track extension of said servo marks.

10. The storage device according to claim 8, with said servo marks comprise topographical marks and wherein the track pitch ranges from said cross track extension of said servo marks plus an additional ring width of a ring surrounding the topographical marks to twice said cross track extension of said servo marks.

11. The storage device according to claim 1, wherein said stored servo sequences are encoded with an error correcting code, said device being operable to decode said error correcting code.

12. The storage device according to claim 1, wherein said servo sequences are stored by one of serially in one of said tracks of a storage field, in parallel in respective tracks of at least two of said storage fields, or in combined parallel and serial way in respective tracks of at least two of said storage fields.

13. The storage device according to claim 1 wherein said at least one read transducer comprises an array of said at least one read transducer operable to scan said storage medium for mark detection purposes, wherein said storage medium has respective fields to be scanned by an associated read transducer, wherein at least one of said respective fields comprises said servo marks.

14. A method for operating a storage device having a storage medium for storing data in marks in multiple tracks aligned along multiple track center lines and stored servo sequences, which are replicated by use of at least two different types of servo marks, each type of servo mark being displaced by a given unique distance in a cross track direction relative to a respective track center line, wherein said storage device is operable to retrieve said servo sequences using read-back signals obtained from said at least two different types of servo marks, comprising the steps of:
obtaining read-back signals from said at least two different types of servo marks; and
retrieving servo sequences using said read-back signals by calculating an estimated amplitude value of each of said read-back signals obtained from said at least two different types of servo marks and assigning a respective weight thereto.

15. A storage device comprising:
a storage medium for storing data in the form of marks in multiple tracks, said tracks being aligned along respective track center lines and said marks having a nominal position in an on-track direction;
at least one read transducer for writing and reading said data stored in said storage medium; and
an actuator for moving said storage medium relative to said at least one read transducer;
the storage device further comprising:
stored servo sequences comprising different types of phase marks, each type of which is displaced by a given unique distance in said on-track direction relative to said respective nominal position in the on-track direction, and wherein said storage device is operable to retrieve said servo sequences using read-back signals obtained from at least two different types of said phase marks, said device being operable to retrieve said servo sequences by calculating an estimated amplitude value of each of said read-back signals obtained from said at least two different types of servo marks and assigning a respective weight thereto.

16. The storage device according to claim 15, wherein said servo sequences are stored by one of serially in one of said tracks of a storage field, in parallel in respective tracks of at least two of said storage fields, or in combined parallel and serial way in respective tracks of at least two of said storage fields.

17. The storage device according to claim 15, wherein said servo sequences comprise additional information in addition to a phase information.

18. A method for operating a storage device, comprising a storage medium for storing data in the form of marks in multiple tracks, said tracks being aligned along respective track center lines and said marks having a nominal position in an on-track direction, at least one read transducer for writing and reading said data stored in said storage medium; an actuator for moving said storage medium relative to said at least one read transducer; stored servo sequences comprising different types of phase marks, each type of which is displaced by a given unique distance in said on-track direction relative to said respective nominal position in the on-track direction, and wherein said storage device is operable to retrieve said servo sequences using read-back signals obtained from at least two different types of said phase marks, comprising the steps of:
obtaining read-back signals from at least two different types of phase marks; and
retrieving said servo sequences using read-back signals obtained from at least two different types of phase marks, by calculating an estimated amplitude value of each of said read-back signals obtained from said at least two different types of servo marks and assigning a respective weight thereto.

* * * * *